United States Patent
Greb (10) Patent No.: US 12,515,321 B2
(45) Date of Patent: Jan. 6, 2026

(54) METHOD FOR GENERATING A TRAINING DATASET FOR TRAINING AN INDUSTRIAL ROBOT

(71) Applicant: Gerhard Schubert GmbH, Crailsheim (DE)

(72) Inventor: Daniel Greb, Crailsheim (DE)

(73) Assignee: Gerhard Schubert GmbH, Crailsheim (DE)

( * ) Notice: Subject to any disclaimer, the term of this patent is extended or adjusted under 35 U.S.C. 154(b) by 296 days.

(21) Appl. No.: 17/998,754

(22) PCT Filed: May 10, 2021

(86) PCT No.: PCT/EP2021/062343
§ 371 (c)(1),
(2) Date: Nov. 14, 2022

(87) PCT Pub. No.: WO2021/228771
PCT Pub. Date: Nov. 18, 2021

(65) Prior Publication Data
US 2023/0202035 A1     Jun. 29, 2023

(30) Foreign Application Priority Data
May 15, 2020 (DE) ...................... 10 2020 113 277.8

(51) Int. Cl.
*B25J 9/16* (2006.01)
*B25J 19/02* (2006.01)

(52) U.S. Cl.
CPC ............... *B25J 9/163* (2013.01); *B25J 9/161* (2013.01); *B25J 9/1671* (2013.01); *B25J 9/1697* (2013.01); *B25J 19/023* (2013.01)

(58) Field of Classification Search
CPC . B25J 19/023; B25J 9/161; B25J 9/163; B25J 9/1671; B25J 9/1692; B25J 9/1697;
(Continued)

(56) References Cited

U.S. PATENT DOCUMENTS

| | | | |
|---|---|---|---|
| 2018/0260668 A1* | 9/2018 | Shen | G06V 10/82 |
| 2018/0349725 A1* | 12/2018 | Konolige | B25J 9/161 |
| 2019/0184570 A1 | 6/2019 | Yung et al. | |

FOREIGN PATENT DOCUMENTS

| | | |
|---|---|---|
| DE | 202008003348 U1 | 7/2009 |
| DE | 102015012961 A1 | 4/2017 |

(Continued)

OTHER PUBLICATIONS

International Search Report and Written Opinion dated Aug. 25, 2021, pertaining to Int'l Patent Application No. PCT/EP2021/062343, 11 pgs.

*Primary Examiner* — Khoi H Tran
*Assistant Examiner* — Alyse Tramanh Tran
(74) *Attorney, Agent, or Firm* — DINSMORE & SHOHL LLP (57) ABSTRACT

A method for generating a training data set for training an industrial robot which can be trained based on a corresponding training data set, comprising: providing a first imaging information, which describes a first one- or multi-dimensional image of an object which is to be relocated by means of an industrial robot which is to be trained on the basis of the training data set to be generated; processing the first imaging information to generate further imaging information, which describes at least one artificially generated further one- or multi-dimensional image of the object which is to be moved by means of an industrial robot which is to be trained on the basis of the training data set to be generated; and processing the further imaging information to generate a training data set for training an industrial robot which can be trained on the basis of the training data set.

19 Claims, 2 Drawing Sheets

(58) Field of Classification Search
CPC .................. B25J 9/1664; G06T 17/00; G06T 2207/10028; G06T 2207/20081; G06T 2207/20221; G05B 2219/39543; G05B 2219/40564
See application file for complete search history.

(56) References Cited

FOREIGN PATENT DOCUMENTS

| | | |
|---|---|---|
| DE | 102017008836 A1 | 3/2018 |
| DE | 102018002423 A1 | 10/2018 |
| DE | 102016009030 B4 | 5/2019 |
| DE | 102019002065 A1 | 10/2019 |
| EP | 2263837 B1 | 6/2013 |
| EP | 3515671 B1 | 5/2020 |
| WO | 2019021044 A1 | 1/2019 |
| WO | WO-2020142498 A1 * | 7/2020 |

* cited by examiner

METHOD FOR GENERATING A TRAINING DATASET FOR TRAINING AN INDUSTRIAL ROBOT

CROSS-REFERENCE TO RELATED APPLICATIONS

This application is a national stage entry of PCT/EP2021/062343 filed May 10, 2021, which claims the benefit of German Patent Application No. DE 10 2020 113 277.8 filed May 15, 2020, the entire disclosures of which are hereby incorporated herein by reference.

FIELD

The disclosure relates to a method for generating a training data set for training an industrial robot which can be trained on the basis of a corresponding training data set, wherein the industrial robot comprises at least one handling device, which comprises at least one handling element which can be moved in at least one degree of freedom of movement for handling an object which is to be moved from a first orientation and/or position to a second orientation and/or position.

BACKGROUND

Training data sets for training industrial robots are widely known from the field of robotics, more particularly in conjunction with the concept of machine learning.

Corresponding training data sets aim to train an industrial robot in conjunction with a particular task, such as, for example, a pick-and-place or separation task, more particularly such that the data provided to said industrial robot within the context of the task, such as for example capture data relating to objects to be handled, are processed in such a manner that an action leading to the resolving of the respective task can be executed in a manner as automated as possible.

Thus corresponding methods for generating training data sets for training industrial robots are in principle also known in different embodiments from the field of robotics.

There is room for improvement in such methods in that, to date, the training data sets are sometimes generated in very lengthy and complex processes, and therefore ways of generating corresponding training data sets in an easy yet efficient manner are needed. More particularly, a user who wants to train an industrial robot for a particular task should be able to easily execute the generation of corresponding training data sets.

SUMMARY

The object underlying the disclosure is that of specifying an improved method for generating a training data set for an industrial robot, more particularly with respect to making it possible to easily but also efficiently generate corresponding training data sets.

The object is achieved by a method for generating a training data set for training an industrial robot according to claim 1. The dependent claims relate to possible embodiments of the method.

A first aspect of the disclosure relates to a method for generating a training data set for training an industrial robot which can be trained on the basis of a corresponding training data set. A corresponding industrial robot typically comprises at least one handling device, which comprises at least one handling element, i.e. for example a gripping element, suction element etc., for example for handling an object which is to be relocated from a first spatial orientation and/or position to a second spatial orientation and/or position. A corresponding handling device of a corresponding industrial robot can optionally be considered or regarded as an end-effector device. In embodiments, a corresponding handling element can thus optionally also be considered or regarded as an end-effector element.

A corresponding industrial robot is configured for the automatable or automated execution of actions to resolve particular assignments or tasks. Corresponding assignments or tasks could be, for example, pick-and-place or relocation or singulation assignments with respect to one or more objects. A corresponding industrial robot can thus be an industrial robot configured to execute pick-and-place or relocation or separation assignments with respect to one or more objects.

In embodiments, a corresponding industrial robot can be designed as a collaborative industrial robot ("cobot") or comprise same. Thus the method for generating a training data set can be implemented to train a collaborative industrial robot ("cobot").

A corresponding industrial robot can be a constituent part of an assembly, which in addition to the industrial robot comprises one or more peripherals. A corresponding peripheral can for example be designed as, or comprise, a feed device for feeding objects, more particularly objects which are in a first orientation and/or position, to an action region of at least one handling element of the handling device of the industrial robot. Alternatively or additionally, a corresponding peripheral device can be designed as, or comprise, a removal device for removing objects, more particularly objects moved by means of the industrial robot to the second orientation and/or position.

A corresponding assembly or machine can be a packaging machine for packaging objects, or can be a constituent part of same. A corresponding packaging machine can for example be set up to move objects, such as foods, cosmetic items, pharmaceutical items, technical items, from a first orientation and/or position to a second orientation and/or position, i.e. for example to a carrier-like receiving device.

A training data set which can be or is generated according to the method is used for example to generate a model for controlling an industrial robot in connection with the execution of a particular assignment or task, on the basis of which model the industrial robot can be controlled to execute the respective assignment or task. As is shown below, data or information are provided for this purpose, and are processed in a particular manner to generate a respective training data set. A training data set generated according to the method thus typically relates to one or more assignments or tasks to be executed by an industrial robot, the execution of which the industrial robot is to be "trained" to do. The provided data or information for generating a respective training data set are typically processed using algorithms, which process the provided data or information for generating a respective training data set, i.e. more particularly with regard to a particular assignment or task which is to be trained. Corresponding algorithms can for example be set up to identify patterns and/or regularities in provided data or information, or to extract same from provided data. This can make it possible for "unknown" data to then be processed in a corresponding manner, which can more particularly permit new patterns and/or regularities to be identified.

The method for generating a corresponding training data set for training an industrial robot comprises the steps described in more detail below:

In a first step of the method, a first imaging information is provided, which describes a first one- or multi-dimensional image of an object which is to be moved by means of an industrial robot which is to be trained on the basis of the training data set to be generated. In the first step of the method, a first imaging information is thus provided for example by means of a suitable provisioning device implemented by means of hardware and/or software. The first imaging information describes or relates to a first one- or multi-dimensional image of an object which is to be moved by means of an industrial robot which is to be trained on the basis of the training data set to be generated. The first imaging information can describe a one- or multi-dimensional image of a particular object, for example in a particular orientation and/or position and/or in front of a particular foreground or background and/or in a particular lighting situation. The object described by the first imaging information is typically the object the handling of which the industrial robot is to be trained in on the basis of the training data set to be generated for the execution of a particular assignment.

As mentioned, the first imaging information can describe for example an image of the respective object in a first spatial orientation and/or position and/or in a first spatial environment, more particularly in front of a first foreground and/or background, and/or under a first chemical and/or physical condition, such as, for example, in a first chemical composition, at a first pressure, having a first moisture, having a first temperature, etc., and/or in a first lighting situation and/or in a first color.

Irrespective of its specific content, the first imaging information is typically a digital information which can be processed using suitable data or image processing measures implemented by means of hardware and/or software.

In a second step of the method, the first imaging information is processed to generate further imaging information, which describes at least one artificially generated further one- or multi-dimensional image of the object which is to be moved by means of an industrial robot which is to be trained on the basis of the training data set to be generated. In the second step of the method, the first imaging information provided in the first step of the method is thus processed, for example by means of a suitable data or image processing device implemented by means of hardware and/or software or is processed by means of cloud computing, in order to generate a further imaging information. In the second step of the method, a further imaging information is thus generated by processing the first imaging information. The result of the second step of the method is thus a further imaging information, which was generated on the basis of the first imaging information. The further imaging information describes or relates to a one- or multi-dimensional image, artificially generated more particularly on the basis of the first imaging information, of the object to be moved by the industrial robot which is to be trained on the basis of the training data set to be generated. The further imaging information thus typically describes the same object as the first imaging information; however, in comparison with the first imaging information, the object can, in the further imaging information, be described in another, artificially generated, one- or multi-dimensional image and/or in another or a further, artificially generated, orientation and/or position and/or in front of another or a further, artificially generated, foreground and/or backgrounds and/or in another or a further, artificially generated, lighting situation. In the further imaging information, the object can thus be described for example in at least one artificially generated representation, optionally also in an artificially generated environment.

The further imaging information can describe for example an artificially generated image of the object in at least one further spatial orientation and/or position and/or in at least one further spatial environment, more particularly in front of at least one further background, and/or under at least one further chemical and/or physical condition, such as, for example, in a further chemical composition, at a further pressure, having a further moisture, having a further temperature, etc., and/or in at least one further lighting situation and/or in at least one further color.

More particularly, the further imaging information can describe an artificially generated image of the respective object in a more particularly ordered or unordered arrangement with at least one further object, more particularly at least one further object of the same or different kind or type. Thus an object described in a first imaging information can, in the second imaging information, be imaged or described in an arrangement with further objects. In this manner, the information content of the further imaging information, which information content is necessary or useful for the generation of a training data set, can be extended in comparison with the first imaging information.

Irrespective of its specific content, the further imaging information is typically a digital information which can be processed using suitable data or image processing measures implemented by means of hardware and/or software.

For processing the first imaging information and thus for generating the further imaging information, suitable data process measures can thus be applied, i.e. more particularly suitable imaging processing measures, which enable a corresponding first imaging information to be processed to generate a corresponding further imaging information. Corresponding data or image processing measures can be implemented using suitable data or image processing algorithms.

In a third step of the method, the further imaging information is processed to generate a training data set for training an industrial robot which can be trained on the basis of the training data set. In the third step of the method, the further imaging information generated in the second step of the method is processed for example by means of the or a suitable data or image processing device implemented by means of hardware and/or software, in order to generate a training data set on the basis of which a corresponding industrial robot can be trained. In the third step of the method, a training data set is thus generated by processing the further imaging information. The result of the third step of the method is thus a training data set, which was generated on the basis of the further imaging information.

Important to the method in some embodiments is the generation, which takes place in the second step more particularly in an automatable or automated manner, of the further imaging information, which describes the respective object in several artificially generated situations, i.e. for example in several different artificially generated orientations or positions and/or in front of several different artificially generated foregrounds and/or backgrounds and/or in several different artificially generated lighting situations. The information content contained in the first imaging information, i.e. more particularly the information described in the first imaging information in relation to the respective object, is artificially extended by the further imaging information, as in the further imaging information, information is described in relation to the respective object in at least one artificially generated further one- or multi-dimensional image. In some embodiments, this is an important aspect for the generation of a corresponding training data set and for the training of the respective industrial robot, as the training of the industrial robot can thus be carried out on the basis of a plurality of different information, described by the respective further imaging information, in relation to the respective object to be moved, although originally, only one (single) imaging information, namely the first imaging information, was provided.

Overall, an improved method is thus provided for generating a training data set for training an industrial robot.

As mentioned, the processing of the first imaging information for generating the further imaging information can be carried out by means of at least one image processing measure. More particularly, one or more digital image processing measures can be applied which, as also mentioned, can be implemented for example by image processing algorithms. A corresponding digital image processing measure can include at least one measure for identifying particular object parameters, more particularly geometric-structural object parameters, surface (finish) parameters, optical reflection parameters etc. A corresponding image processing measure can also include at least one measure for identifying particular parameters of a foreground and/or background and/or particular chemical and/or physical conditions and/or particular lighting situations and/or particular colors of the object described in the first imaging information.

In this context, although in principle also irrespective of it, it must be mentioned that a corresponding first imaging information can, in embodiments, contain meta-information or, in embodiments, meta-information can be assigned to a corresponding first imaging information. Corresponding items of meta-information can describe or relate to one or more items of sub-information. Corresponding meta-information can thus provide details about what is described or "can be seen" in a respective first imaging information. The meta-information contained in or assigned to the first imaging information can be artificially changed and/or artificially replicated in the further imaging information.

A corresponding sub- or meta-information can thus for example be a type or class information describing a type or class of at least one object, which type or class has to date also been called a "format" in pick-and-place applications. Thus the type or class of at least one object contained in a first imaging information can be used as sub-information or as meta-information.

Alternatively or additionally, a corresponding sub- or meta-information can for example be an absolute orientation information and/or absolute position information describing an absolute orientation and/or absolute position of at least one object. An absolute orientation information and/or absolute position information can be specified in terms of position angles and/or world coordinates or contain same. Thus an absolute orientation and/or position of at least one object contained in a first imaging information can be used as sub-information or as meta-information.

Alternatively or additionally, a corresponding sub- or meta-information can for example be a relative orientation information and/or relative position information describing a relative orientation and/or relative position of at least one object. A relative orientation information and/or relative position information can be specified in terms of position angles and/or world coordinates or contain same. Thus a relative orientation and/or position of at least one object contained in a first imaging information in relation to at least one further object contained in the imaging information can be used as sub-information or as meta-information.

Alternatively or additionally, a corresponding sub- or meta-information can for example be a foreground information and/or a background information describing a foreground and/or background of at least one object. Thus the foreground and/or background of at least one object contained in a first imaging information can be used as sub-information or as meta-information.

Alternatively or additionally, a corresponding sub- or meta-information can for example be a lighting information describing a lighting situation or the lighting conditions of at least one object. Thus the lighting situation or lighting conditions of at least one object contained in a first imaging information can be used as sub-information or as meta-information.

Alternatively or additionally, a corresponding sub- or meta-information can for example be a driving information describing a driving movement required more particularly from an ACTUAL position and/or ACTUAL orientation or a driving vector of a handling element of the handling device of the industrial robot for driving at least one object contained in a first imaging information. Thus a driving movement required more particularly from and ACTUAL position and/or ACTUAL orientation or a driving vector of a handling element of the handling device of the industrial robot can be detected and used as sub-information or meta-information.

Alternatively or additionally, a corresponding sub- or meta-information can for example be a dimension information describing a at least one geometric-structural dimension of at least one object. Thus at least one dimension of at least one object contained in a first imaging information can be used as sub-information or as meta-information.

Alternatively or additionally, a corresponding sub- or meta-information can for example be a shape information describing a at least one geometric-structural shape (three-dimensional shape) of at least one object. Thus at least one shape of at least one object contained in a first imaging information can be used as sub-information or as meta-information.

Alternatively or additionally, a corresponding sub- or meta-information can for example be a color information describing a color of at least one object. Thus at least one color of at least one object contained in a first imaging information can be used as sub-information or as meta-information.

Alternatively or additionally, a corresponding sub- or meta-information can be a product name information describing, or described by, alphanumeric and/or graphical elements, such as for example a product name, of at least one object, optionally also of a packaging of an object. Thus the alphanumeric and/or graphical elements of at least one object contained in a first imaging information can be used as sub-information or as meta-information.

Alternatively or additionally, a corresponding sub- or meta-information can for example be a surface information describing a surface, more particularly a surface finish, i.e. more particularly the optical surface properties, such as for example a degree of shine or reflection, of at least one object. Thus the surface, more particularly the surface finish, of at least one object contained in a first imaging information can be used as sub-information or as meta-information.

Alternatively or additionally, a corresponding sub- or meta-information can for example be a mass and/or volume information describing a mass, more particularly a center of mass, and/or the volume, more particularly a center of volume, of at least one object. Thus the mass, more particularly a center of mass, and/or the volume, more particularly a center of volume, of at least one object contained in a first imaging information can be used as sub-information or as meta-information.

As mentioned, the digital image processing measure for generating the further imaging information can be carried out by means of cloud computing. Alternatively or additionally, it is possible to implement the digital image processing measure by means of at least one deep learning measure, more particularly with the involvement of at least one one- or multi-layer artificial neural network.

The generation of the training data set carried out in the third step of the method can optionally be carried out by means of cloud computing. Thus a corresponding training data set can in principle be carried out centrally or decentrally. A central generation of a corresponding training data set can for example be achieved if the training data set is carried out by means of a central or local data processing device, such as a local computer, smartphone, tablet, etc. A decentral generation of a corresponding training data set can for example be achieved if the training data set is carried out by means of a decentral or global data processing device such as a server connected to a superordinate data or communication network such as for example an intranet or the internet.

The first imaging information for example can be, or can be provided as, a digital image information of the object generated by an image capture or camera device implemented more particularly by means of hardware and/or software. A first imaging information can thus be for example a photograph or a video of a respective object or of an image of a respective object. The first imaging information can thus for example be generated by an image capture or camera device optionally integrated in a user-side (mobile) terminal such as for example a smartphone, tablet, laptop, etc.

Alternatively or additionally, the first imaging information can be, or can be provided as, a digital design information of a respective object generated by means of a design program device, more particularly implemented by means of hardware and/or software. A first imaging information can for example be a CAD file, STL file, etc. of a respective object. The first imaging information can thus be generated for example by a computer-based design program, such as for example a CAD program.

Alternatively or additionally, the first imaging information can be, or can be provided as, an electronic document including an image of a respective object or a corresponding file. A first imaging information can for example be an editable or non-editable document which includes a respective object. The first imaging information can thus be a pdf file, a presentation file, a word processing file, a web page etc.

In embodiments, the method can comprise a step of transmitting the further imaging information to an industrial robot to be trained and/or to a cloud computing device. Thus the further imaging information can be transmitted via a suitable data or communications connection to an industrial robot to be trained and/or to a cloud computing device. A corresponding data or communications connection can be or comprise a wired or wireless data or communications connection via one or more data or communication networks. A corresponding data or communications connection can be encrypted or unencrypted.

A second aspect of the disclosure relates to a method for training an industrial robot which can be trained on the basis of a corresponding training data set, wherein the industrial robot comprises at least one handling device, which for example comprises at least one handling element which can be moved in at least one degree of freedom of movement for handling an object which is to be moved from a first orientation and/or position to a second orientation and/or position. The method comprises the following steps: Providing a training data set which was generated according to a method according to the first aspect of the disclosure, and training the industrial robot on the basis of the provided training data set. Embodiments in connection with the method according to the first aspect of the disclosure apply accordingly to the method according to the second aspect of the disclosure, and vice versa.

The training of the industrial robot can be implemented or carried out by means of at least one measure for machine learning. The at least one measure for machine learning typically includes the processing of a corresponding training data set. The at least one measure for machine learning can more particularly be implemented or carried out by means of at least one deep learning measure, more particularly with the involvement of at least one one- or multi-layer artificial neural network. A respective artificial neural network can thus have one or more intermediate layers implemented between an input layer and an output layer. More particularly, neural networks having a plurality of corresponding intermediate layers can be used, as in this manner, better training results can regularly be achieved.

The training of the industrial robot can be performed or implemented by means of cloud computing. The industrial robot to be trained can thus be connected, via a suitable data or communications connection, to a cloud computing device for example in the form of a corresponding IT infrastructure or a computer network, via which the training of the industrial robot can be carried out. Thus a correspondingly generated training data set can be processed via cloud computing for training the industrial robot. The industrial robot therefore does not necessarily have to be configured by means of hardware and/or software to "train itself". Rather, the training of the industrial robot can take place via a corresponding IT infrastructure or a corresponding computer network, with which the industrial robot communicates via a data or communications connection.

The training of the industrial robot can contain at least one simulation-executed action and/or at least one actually executed action of the handling device of the industrial robot. More particularly, it is conceivable that trained actions of the handling device are first simulated at least once before being actually executed.

Within the context of training of the industrial robot, a control data set can be generated on the basis of the provided training data set in order to control the operation of the industrial robot. The control data set can contain control information for executing a particular assignment or task. During further training of the industrial robot, the control data set can be updated or changed.

A third aspect of the disclosure relates to a method for controlling the operation of an industrial robot, wherein the industrial robot comprises at least one handling device, which for example comprises at least one handling element which can be moved in at least one degree of freedom of movement for handling an object which is to be moved from a first orientation and/or position to a second orientation and/or position. The method comprises the following steps: Providing a control data set for controlling the operation of the industrial robot, wherein the control data set was generated by means of a method according to the first aspect of the disclosure, or the control data was generated on the basis of a method according to the second aspect of the disclosure, and controlling the operation of the industrial robot on the basis of the provided control data set. Embodiments in connection with the method according to the first aspect of the disclosure and the method according to the second aspect of the disclosure apply accordingly to the method according to the third aspect of the disclosure, and vice versa.

A fourth aspect of the disclosure relates to an industrial robot, more particularly a collaborative industrial robot ("cobot"), comprising at least one handling device, which for example comprises at least one handling element which can be moved in at least one degree of freedom of movement for handling an object which is to be moved from a first orientation and/or position to a second orientation and/or position. The industrial robot is trained on the basis of a training data set generated according to a method according to the first aspect of the disclosure, or is trained on the basis of a method according to the second aspect of the disclosure, and or is controllable or controlled on the basis of a method according to the third aspect of the disclosure. Embodiments in connection with the method according to the first aspect of the disclosure, the method according to the second aspect of the disclosure, the method according to the third aspect of the disclosure apply similarly to the industrial robot according to the fourth aspect of the disclosure, and vice versa.

BRIEF DESCRIPTION OF THE DRAWINGS

The disclosure is explained in more detail on the basis of the exemplary embodiments in the drawings.

DETAILED DESCRIPTION

Figure 1:
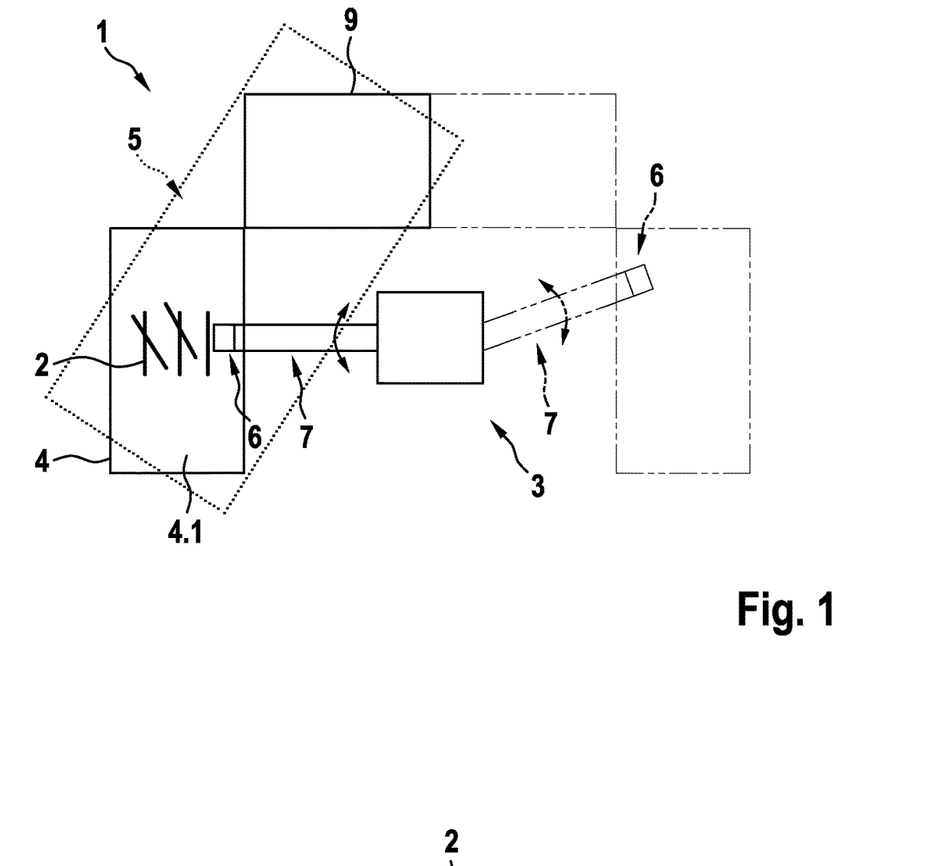
FIG. 1 provides a schematic representation of an assembly for moving objects from a first orientation and/or position to a second orientation and/or position according to an exemplary embodiment.

FIG. 1 shows a schematic representation of an assembly 1 for relocating objects 2 from a first orientation and/or position to a second orientation and/or position according to an exemplary embodiment in a top view. The assembly 1 can also be described or regarded as a machine.

The assembly 1 comprises an industrial robot 3 designed for example as a collaborative industrial robot ("cobot") and several peripherals. In the embodiment, the peripherals are: a feed device 4 for example designed as a feed belt for feeding objects 2, more particularly objects 2 in a first orientation and/or position, to an action region 5 of an end effector element or handling element 6, for example designed as a gripping or suction element, of an end effector or handling device 7 of the industrial robot 3; and a removal device 9, for example designed as a removal belt, for removing objects 2, more particularly objects 2 moved to a second orientation and/or position by means of the industrial robot.

The dashed lines indicate that the assembly 1 can also comprise several corresponding peripherals and several corresponding end effector or handling devices 7 in addition to the associated end effector or handling element 6.

The assembly 1 also comprises a control device 8 implemented by means of hardware and/or software, which is set up to control the operation of the industrial robot 3. The control device 8 shown in FIG. 1 purely by way of example as a structural constituent part of the industrial robot 3 is thus set up to generate control data sets or control information, on the basis of which the operation of the industrial robot 3 is controlled in order to execute particular assignments or tasks. Corresponding assignments or tasks could be, for example, pick-and-place or move or simulating assignments with respect to one or more objects 2.

The control data sets or control information on which operation of the industrial robot 3 is based were generated within the context of training of the industrial robot 3. The training of the industrial robot 3 is carried out on the basis of a training data set.

The training of the industrial robot 3 can be implemented or carried out by means of at least one measure for machine learning. The at least one measure for machine learning includes the processing of a corresponding training data set. The at least one measure for machine learning can more particularly be implemented or carried out by means of at least one deep learning measure, more particularly with the involvement of at least one one- or multi-layer artificial neural network. A respective artificial neural network can thus have one or more intermediate layers implemented between an input layer and an output layer.

The training of the industrial robot 3 can be carried out or implemented by means of cloud computing. The industrial robot 3 can thus be connected, via a suitable data or communications connection, to a cloud computing device 9, i.e. a corresponding IT infrastructure or a computer network, via which the training of the industrial robot 3 can be carried out. Thus a training data set can be processed via cloud computing for training the industrial robot 3. The industrial robot 3 therefore does not necessarily have to be configured by means of hardware and/or software to "train itself". Rather, the training of the industrial robot 3 can take place via a corresponding IT infrastructure or a corresponding computer network, with which the industrial robot 3 communicates via a data or communications connection.

The training of the industrial robot 3 can contain at least one simulation-executed action and/or at least one actually executed action of the handling device 7. More particularly, it is conceivable that trained actions of the handling device 7 are first simulated at least once before being actually executed.

As mentioned, within the context of training of the industrial robot 3, a control data set can be generated on the basis of the training data set in order to control the operation of the industrial robot 3. The control data set can contain control information for executing a particular assignment or task. During further training of the industrial robot, the control data set can be updated or changed.

An exemplary embodiment of a method for generating a training data set for training the industrial robot 3 is described in more detail below with reference to FIGS. 2-4.

A corresponding training data set is typically used to generate a model for controlling an industrial robot 3 in connection with the execution of a particular assignment or task, on the basis of which the industrial robot 3 can be controlled to execute the respective assignment or task. Data or information are provided for this purpose, and are processed in a particular manner to generate a respective training data set. A corresponding training data set thus typically relates to one or more assignments or tasks to be executed by an industrial robot, the execution of which the industrial robot is to be "trained" or "learned" to do. The provided data or information for generating a respective training data set are typically processed using algorithms, which process the provided data or information for generating a respective training data set, i.e. more particularly with regard to a particular assignment or task which is to be trained. Corresponding algorithms can for example be set up to identify patterns and/or regularities in provided data or information, or to extract same from provided data. This can make it possible for "unknown" data to then be processed in a corresponding manner, which can more particularly permit new patterns and/or regularities to be identified.

In a first step S1 of the method, a first imaging information AI1 is provided for example by means of a suitable provisioning device implemented by means of hardware and/or software. The first imaging information AI1 describes or relates to a first one- or multi-dimensional image of an object 2 which is to be moved by means of an industrial robot 3 which is to be trained on the basis of the training data set to be generated. The first imaging information AI1 shown in an exemplary embodiment in FIG. 2 can describe a one- or multi-dimensional image of a particular object 2, for example in a particular orientation and/or position and/or in front of a particular foreground or background and/or in a particular lighting situation. The object described by the first imaging information is typically the object the handling of which the industrial robot is to be trained in on the basis of the training data set to be generated for the execution of a particular assignment.

Figure 2:
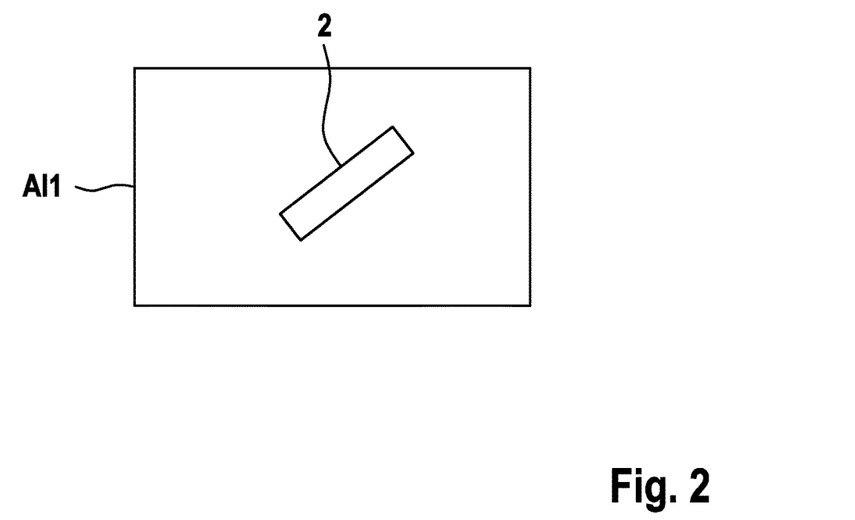
FIG. 2 provides a schematic representation of a first imaging information according to an exemplary embodiment.

In the exemplary embodiment shown in FIG. 2, the first imaging information I1 describes a multi-dimensional image of an object 2 imaged in front of a neutral background. The object 2 has an elongate geometry purely by way of example. The object 2 can specifically be for example a chocolate bar to be packaged in a box-like or carrier-like packaging for receiving a plurality of chocolate bars.

The first imaging information AI1 thus describes an image of the respective object 2 in a first spatial orientation and/or position and/or in a first spatial environment, more particularly in front of a first foreground and/or background, and/or under a first chemical and/or physical condition, such as, for example, in a first chemical composition, at a first pressure, having a first moisture, having a first temperature, etc., and/or in a first lighting situation and/or in a first color.

Irrespective of its specific content, the first imaging information AI1 is typically a digital information which can be processed using suitable data or image processing measures implemented by means of hardware and/or software.

In a second step S2 of the method, the first imaging information AI1 provided in the first step S1 of the method is processed, for example by means of a suitable data or image processing device implemented by means of hardware and/or software or is processed by means of cloud computing, in order to generate a further imaging information AI2. The result of the second step S2 of the method is thus a further imaging information AI2, which was generated on the basis of the first imaging information AI1. The further imaging information AI2 shown in an embodiment in FIG. 3 describes or relates to a one- or multi-dimensional image, artificially generated more particularly on the basis of the first imaging information AI1, of the object 2 to be moved by the industrial robot 2 which is to be trained on the basis of the training data set to be generated. The further imaging information AI2 thus typically describes the same object 2 as the first imaging information AI1; however, in comparison with the first imaging information AI1, the object 2 can, in the further imaging information AI2, be described in another, artificially generated, one- or multi-dimensional image and/or in another or a further, artificially generated, orientation and/or position and/or in front of another or a further, artificially generated, foreground and/or backgrounds and/or in another or further, artificially generated, lighting situation. In the further imaging information AI2, the object 2 can thus be described for example in at least one artificially generated representation, optionally also in an artificially generated environment.

The further imaging information AI2 thus describes an artificially generated image of the object 2 in at least one further spatial orientation and/or position and/or in at least one further spatial environment, more particularly in front of at least one further background, and/or under at least one further chemical and/or physical condition, such as, for example, in a further chemical composition, at a further pressure, having a further moisture, having a further temperature, etc., and/or in at least one further lighting situation and/or in at least one further color.

Figure 3:
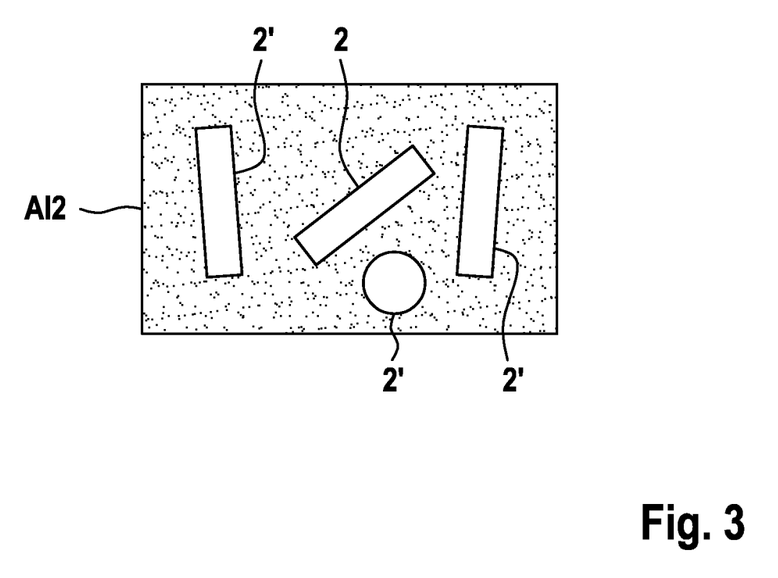
FIG. 3 provides a schematic representation of a further imaging information according to an exemplary embodiment.
Figure 4:
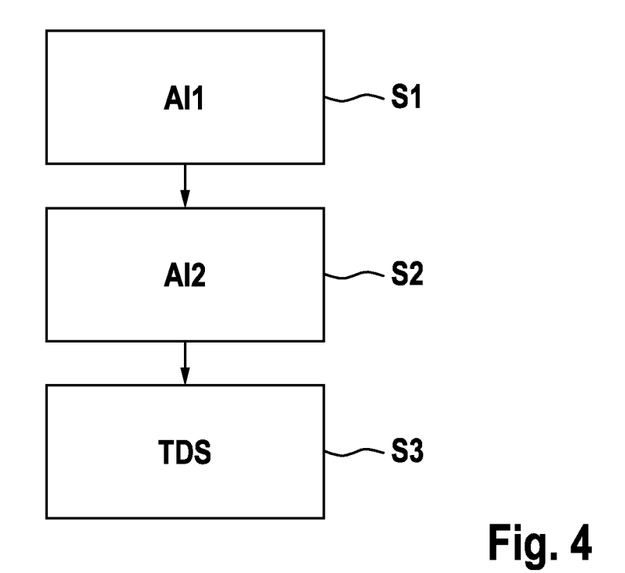
FIG. 4 provides a block diagram for representing a method for generating a training data set for training an industrial robot according to an exemplary embodiment.

As indicated in FIG. 3, the further imaging information AI2 can describe an artificially generated image of the respective object 2 in a more particularly ordered or unordered arrangement with at least one further object 2' of the same or different kind or type. Thus the object 2 described in a first imaging information AI1 can, in the second imaging information AI2, be respectively imaged or described in an artificially generated arrangement with further objects 2'.

Irrespective of its specific content, the further imaging information AI2 is typically a digital information which can be processed using suitable data or image processing measures implemented by means of hardware and/or software.

For processing the first imaging information AI1 and thus for generating the further imaging information AI2, suitable data process measures can thus be applied, i.e. more particularly suitable imaging processing measures, which enable a corresponding first imaging information AI1 to be processed to generate a corresponding further imaging information AI2. Corresponding data or image processing measures can be implemented using suitable data or image processing algorithms.

In a third step S3 of the method, the further imaging information AI2 generated in the second step S2 of the method is processed for example by means of the or a suitable data or image processing device implemented by means of hardware and/or software, in order to generate a training data set TDS on the basis of which a corresponding industrial robot 3 can be trained. In the third step S3 of the method, a training data set TDS is thus generated by processing the further imaging information AI2. The result of the third step S3 of the method is thus a training data set TDS, which was generated on the basis of the further imaging information AI2.

Important to the method in some embodiments is the generation, which takes place in the second step S2 more particularly in an automatable or automated manner, of the further imaging information AI2, which describes the respective object 2 in several artificially generated situations, i.e. for example in several different artificially generated orientations or positions and/or in front of several different artificially generated foregrounds and/or backgrounds and/or in several different artificially generated lighting situations. The information content contained in the first imaging information AI1, i.e. more particularly the information described in the first imaging information AI1 in relation to the respective object 2, is artificially extended by the further imaging information AI2, as in the further imaging information AI2, information is described in relation to the respective object 2 in at least one artificially generated further one- or multi-dimensional image. In some embodiments, this is an important aspect for the generation of a training data set TDS and for the training of the respective industrial robot 3, as the training of the industrial robot 3 can be carried out on the basis of a plurality of different information, described by the respective further imaging information AI2, in relation to the respective object 2 to be relocated, although originally, only one (single) imaging information AI1, namely the first imaging information AI1, was provided.

As mentioned, the processing of the first imaging information AI1 for generating the further imaging information AI2 can be carried out by means of at least one image processing measure. More particularly, one or more digital image processing measures can be applied which, as also mentioned, can be implemented for example by image processing algorithms. A corresponding digital image processing measure can contain at least one measure for identifying particular object parameters, more particularly geometric-structural object parameters, surface (finish) parameters, optical reflection parameters etc. A corresponding image processing measure can also contain at least one measure for identifying particular parameters of a foreground and/or background and/or particular chemical and/or physical conditions and/or particular lighting situations and/or particular colors of the object described in the first imaging information AI1.

A first imaging information AI1 can contain meta-information or meta-information can be assigned to a first imaging information AI1. Corresponding meta-information can describe or relate to one or more pieces of sub-information described in the first imaging information AI1. The meta-information can thus typically provide details about what is described or "can be seen" in a respective first imaging information AI1. The meta-information contained in or assigned to the first imaging information AI1 can be artificially changed and/or artificially replicated in the further imaging information AI2.

A corresponding sub- or meta-information can thus for example be a type or class information describing a type or class of at least one object 2, which type or class has to date also been called a "format" in pick-and-place applications. Thus the type or class of at least one object 2 contained in a first imaging information can be used as sub-information or as meta-information.

Alternatively or additionally, a corresponding sub- or meta-information can for example be an absolute orientation information and/or absolute position information describing an absolute orientation and/or absolute position of at least one object 2. An absolute orientation information and/or absolute position information can be specified in terms of position angles and/or world coordinates or contain same. Thus an absolute orientation and/or position of at least one object 2 contained in a first imaging information AI1 can be used as sub-information or as meta-information.

Alternatively or additionally, a corresponding sub- or meta-information can for example be a relative orientation information and/or relative position information describing a relative orientation and/or relative position of at least one object 2. A relative orientation information and/or relative position information can be specified in terms of position angles and/or world coordinates or contain same. Thus a relative orientation and/or position of at least one object 2 contained in a first imaging information AI1 in relation to at least one further object contained in the first imaging information AI1 can be used as sub-information or as meta-information.

Alternatively or additionally, a corresponding sub- or meta-information can for example be a foreground information and/or a background information describing a foreground and/or background of at least one object 2. Thus the foreground and/or background of at least one object 2 contained in a first imaging information AI1 can be used as sub-information or as meta-information.

Alternatively or additionally, a corresponding sub- or meta-information can for example be a lighting information describing a lighting situation or the lighting conditions of at least one object 2. Thus the lighting situation or lighting conditions of at least one object 2 contained in a first imaging information AI1 can be used as sub-information or as meta-information.

Alternatively or additionally, a corresponding sub- or meta-information can for example be a driving information describing a driving movement required more particularly from an ACTUAL position and/or ACTUAL orientation or a driving vector of a handling element 6 of the handling device 7 of the industrial robot 3 for driving at least one object 2 contained in a first imaging information AI1 Thus a driving movement required more particularly from and ACTUAL position and/or ACTUAL orientation or a driving vector of a handling element 6 of the handling device 7 of the industrial robot 3 can be detected and used as sub-information or meta-information.

Alternatively or additionally, a corresponding sub- or meta-information can for example be a measurement information describing a at least one geometric-structural measurement of at least one object 2. Thus at least one measurement of at least one object 2 contained in a first imaging information AI1 can be used as sub-information or as meta-information.

Alternatively or additionally, a corresponding sub- or meta-information can for example be a shape information describing a at least one geometric-structural shape (three-dimensional shape) of at least one object 2. Thus at least one shape of at least one object 2 contained in a first imaging information AI1 can be used as sub-information or as meta-information.

Alternatively or additionally, a corresponding sub- or meta-information can for example be a color information describing a color of at least one object 2. Thus at least one color of at least one object 2 contained in a first imaging information AI1 can be used as sub-information or as meta-information.

Alternatively or additionally, a corresponding sub- or meta-information can be a product name information describing, or described by, alphanumeric and/or graphical elements, such as for example a product name, of at least one object 2, optionally also of a packaging of an object 2. Thus the alphanumeric and/or graphical elements of at least one object 2 contained in a first imaging information can be used as sub-information or as meta-information.

Alternatively or additionally, a corresponding sub- or meta-information can for example be a surface information describing a surface, more particularly a surface finish, i.e. more particularly the optical surface properties, such as for example a degree of shine or reflection, of at least one object 2. Thus the surface, more particularly the surface finish, of at least one object 2 contained in a first imaging information AI1 can be used as sub-information or as meta-information.

Alternatively or additionally, a corresponding sub- or meta-information can for example be a mass and/or volume information describing a mass, more particularly a center of mass, and/or the volume, more particularly a center of volume, of at least one object 2. Thus the mass, more particularly a center of mass, and/or the volume, more particularly a center of volume, of at least one object 2 contained in a first imaging information can be used as sub-information or as meta-information.

As mentioned, the digital image processing measure for generating the further imaging information AI2 can be carried out by means of cloud computing. Alternatively or additionally, it is possible to implement the digital image processing measure by means of at least one deep learning measure, more particularly with the involvement of at least one one- or multi-layer artificial neural network.

The generation of the training data set TDS carried out in the third step S3 of the method can optionally be carried out by means of cloud computing. Thus a corresponding training data set TDS can in principle be carried out centrally or decentrally. A central generation of a corresponding training data set TDS can for example be achieved if the training data set TDS is carried out by means of a central or local data processing device, such as a local computer, smartphone, tablet, etc. A decentral generation of a corresponding training data set TDS can for example be achieved if the training data set TDS is carried out by means of a decentral or global data processing device such as a server connected to a superordinate data or communication network such as for example an intranet or the internet.

The first imaging information AI1 for example can be, or can be provided as, a digital image information of the respective object 2 generated by an image capture or camera device implemented more particularly by means of hardware and/or software. A first imaging information AI1 can thus be for example a photograph or a video of a respective object 2 or of an image of the object 2. The first imaging information AI1 can thus for example be generated by an image capture or camera device optionally integrated in a user-side (mobile) terminal such as for example a smartphone, tablet, laptop, etc.

Alternatively or additionally, the first imaging information AI1 can be, or can be provided as, a digital design information of the respective object generated by means of a design program device, more particularly implemented by means of hardware and/or software. A first imaging information AI1 can for example be a CAD file, STL file, etc. of the object 2. The first imaging information AI1 can thus be generated for example by a computer-based design program, such as for example a CAD program.

Alternatively or additionally, the first imaging information AI1 can be, or can be provided as, an electronic document containing an image of the respective object 2 or a corresponding file. A first imaging information AI1 can for example be an editable or non-editable document which includes the respective object 2. The first imaging information AI1 can thus be a pdf file, a presentation file, a word processing file, a web page etc.

The method can comprise a step of transmitting the further imaging information AI2 to an industrial robot 3 to be trained and/or to a cloud computing device. Thus the further imaging information can be transmitted via a suitable data or communications connection to an industrial robot 3 to be trained and/or to a cloud computing device. A corresponding data or communications connection can be or comprise a wired or wireless data or communications connection via one or more data or communication networks. A corresponding data or communications connection can be encrypted or unencrypted.

The invention claimed is:

1. A method for generating a training data set for training an industrial robot which can be trained on the basis of a corresponding training data set, wherein the industrial robot comprises at least one handling device which comprises at least one handling element which can be moved in at least one degree of freedom of movement for handling an object which is to be relocated from a first orientation and/or position to a second orientation and/or position, the method comprising the following steps:
   providing a single image of the object which is to be moved by the industrial robot which is to be trained on the basis of the training data set to be generated,
   processing, via a data or image processing device using one or more data or image processing algorithms, the single image to generate at least one further image including the object in several different artificially generated situations, wherein the only image used to generate the at least one further image including the object in several different artificially generated situations is the single image of the object, and
   processing the at least one further image to generate the training data set for training the industrial robot which can be trained on the basis of the training data set.

2. The method according to claim 1, wherein the processing of the single image for generating the at least one further image is carried out by means of a digital image processing measure.

3. The method according to claim 2, wherein the digital image processing measure includes at least one measure for detecting particular object parameters, more particularly geometric-structural object parameters, surface (finish) parameters.

4. The method according to claim 2, wherein the digital image processing measure is carried out by means of cloud computing.

5. The method according to claim 2, wherein the digital image processing measure is implemented by means of at least one deep learning measure with the involvement of at least one artificial neural network.

6. The method according to claim 1, wherein the single image can be provided as a digital image of the object generated by means of a camera device implemented by means of hardware and/or software, or as a digital design information of the object generated by means of a design program device implemented by means of hardware and/or software, or as an electronic document including an image of the object.

7. The method according to claim 1, further comprising transmitting the at least one further image to the industrial robot to be trained and/or to a cloud computing device.

8. A method for training the industrial robot, comprising:
   providing the training data set, which was generated according to the method according to claim 1, and
   training the industrial robot on the basis of the provided training data set.

9. The method according to claim 8, wherein the training of the industrial robot includes at least one actually executed and/or simulation-executed action of the handling device of the industrial robot.

10. The method according to claim 8, wherein within the context of training of the industrial robot on the basis of the provided training data set, a control data set for controlling an operation of the industrial robot is generated.

11. A method for controlling an operation of the industrial robot, comprising:
providing a control data set for controlling the operation of the industrial robot, wherein the control data set was generated on the basis of the training data set generated according to the method according to claim 1, and
controlling the industrial robot on the basis of the provided control data set.

12. An industrial robot trained on the basis of the training data set generated according to the method according to claim 1.

13. The method according to claim 1, wherein the single image is generated from a photograph or a video of the object, from an image of the object, from a CAD file of the object, or from an STL file of the object.

14. The method according to claim 1, wherein the at least one further image includes the object in several different artificially generated orientations or positions.

15. The method according to claim 1, wherein the at least one further image includes the object in front of several different artificially generated foregrounds and/or backgrounds.

16. The method according to claim 1, wherein the at least one further image includes the object in several different artificially generated lighting situations.

17. The method according to claim 1, wherein the single image comprises an image of the object in a first spatial orientation and/or position and/or in a first spatial environment, in front of a first background, and/or under a first chemical and/or physical condition and/or in a first lighting situation and/or in a first color.

18. The method according to claim 1, wherein the at least one further image comprises an artificially generated image of the object in at least one further spatial orientation and/or position and/or in at least one further spatial environment, in front of a further background, and/or under at least one further chemical and/or physical condition and/or in at least one further lighting situation and/or in at least one further color.

19. The method according to claim 1, wherein the at least one further image comprises an artificially generated image of the object in a more particularly ordered or unordered arrangement with at least one further object of the same or different kind.

* * * * *